United States Patent [19]

Reichert, Jr.

[11] Patent Number: 4,520,508

[45] Date of Patent: May 28, 1985

[54] SUBSCRIBER TERMINAL FOR MONITORING RADIO-FREQUENCY SIGNAL INGRESS INTO CABLE TELEVISION SYSTEMS

[75] Inventor: Harry J. Reichert, Jr., Warminster, Pa.

[73] Assignee: General Instrument Corporation, New York, N.Y.

[21] Appl. No.: 624,804

[22] Filed: Jun. 26, 1984

Related U.S. Application Data

[63] Continuation-in-part of Ser. No. 451,858, Dec. 21, 1982, abandoned.

[51] Int. Cl.$^3$ .......................... H04H 1/02; H04N 7/18
[52] U.S. Cl. ............................................ 455/4; 455/5; 455/67; 358/86
[58] Field of Search ........................................ 455/2–6, 455/9, 67–69; 358/84, 86; 179/170 F, 170.8, 175.2 C, 175.3 F

[56] References Cited

U.S. PATENT DOCUMENTS

| | | | |
|---|---|---|---|
| 3,668,307 | 6/1972 | Face et al. | 455/5 |
| 3,806,814 | 4/1974 | Forbes | 455/4 |
| 4,317,215 | 2/1982 | Tabata et al. | 455/5 |
| 4,322,854 | 3/1982 | Bundens et al. | 455/5 |
| 4,408,345 | 10/1983 | Yashiro et al. | 455/3 |

*Primary Examiner*—Jin F. Ng
*Attorney, Agent, or Firm*—Hopgood, Calimafde, Kalil, Blaustein & Judlowe

[57] ABSTRACT

A cable television subscriber home terminal capable of transmitting information along a cable to a central station at one of a series of predetermined return frequencies includes a receiver tuned to monitor possible ingress into the system at selected frequencies within the range of the return system frequency. A signal representing the magnitude and frequency of the detected ingress signal modulates a return signal, which is transmitted along the cable system to the headend to provide information concerning the detected ingress signal.

8 Claims, 5 Drawing Figures

SUBSCRIBER TERMINAL FOR MONITORING RADIO-FREQUENCY SIGNAL INGRESS INTO CABLE TELEVISION SYSTEMS

This application is a continuation-in-part application of Ser. No. 451,858, filed Dec. 21, 1982 now abandoned.

The present invention relates generally to cable television systems, and more particularly to a subscriber terminal for use in a cable television system including a return system.

Cable television systems are now in widespread use to provide a full complement of channels of television programming transmitted from a headend at frequencies falling within a forward frequency spectrum over a cable to subscribers whose receivers are connected to the cable. An increasing number of cable systems also include a means for allowing the subscriber to transmit return signals at frequencies falling within a different return frequency spectrum back along the cable to the headend. One example of a cable return system of this type is a security system in which the subscriber's home is provided with sensors that detect, for example, the occurrence of fire or an intrusion in the home, and then automatically cause an alarm signal to be transmitted along the cable from the subscriber's location to the headend. Most cable TV security systems also allow the subscriber, in the event of a fire or a burglary in his home, to press a button at a security control console to cause a coded radio-frequency alarm signal to be transmitted along the cable to the headend. The subscriber's alarm signal, whether derived from a sensor or the operation of a security console, is processed at the headend to identify the subscriber and the nature of the problem, e.g., fire, thereby to permit appropriate help to be quickly provided to the subscriber's home.

Cable return systems may also allow the subscriber to select one of a series of available special programs by the operation of a select button on a console which causes a radio-frequency program-select signal to be transmitted at a frequency within the return spectrum along the cable to the headend from where the selected program is transmitted to the subscriber and appropriate billing data is prepared based on the subscriber's program selection.

In a conventional cable television system the headend is connected to a trunk cable along which a series of amplifying trunk stations are distributed. Each of the trunk stations is typically connected to a cable span, which is, in turn, coupled through a series of directional couplers to a series of drop lines. The latter are, in turn, connected, usually through a set-top converter, to the subscribers television receiver. The television signals are transmitted between the headend and the subscribers' locations through a series of coaxial cables all of which include an outer conductor or shield, which is connected to system ground. So long as the outer conductor of the cable remains intact, no leakage of radio-frequency signals can occur either into the cable from an external source or out from the cable into the surrounding area. However, when a break or other loss of integrity occurs in the outer shield conductor of the cable, leakage of ambient radio-frequency signals can occur into the cable (ingress) and radio-frequency signals on the inner central conductor of the cable can leak out of the cable (egress).

Cable return systems of the type described are commonly located in areas in which ambient radio-freqency signals are produced by such sources as amateur radio operators and business-band communications systems. These apparatus typically produce signal frequencies that fall within the frequency spectrum of the return system, typically between 5 mHz and 30 mHz. In the event of a leak in the cable, these ambient radio-frequency signals may, for the reasons noted above, gain ingress into the cable system. Such ingress of ambient radio-frequency signals into the cable system may be of a suffient magnitude to create undesirable interference with the return signals transmitted along the cable system to the headend. When such ingress and the resulting interference occur in a cable return security system, in which a speedy response to the security call may be essential to the subscriber's health or property, the subscriber whose security message cannot be processed at the headend as a result of such ingress into the cable system may suffer very serious consequences.

Because of the potentially serious consequences of ingress into the cable, operators of cable systems expend considerable effort in locating the source of any radio-frequency leakage into the cable so as to allow the cable to be repaired as quickly as possible with the least possible inconvenience to the operation of the system and the subscribers. When radio-frequency ingress or leakage into the cable is suspected or detected, such as when radio-frequency interference is received at the headend, it is a common practice for a crew equipped with r.f. transmission and detection equipment to be sent in a truck which travels along the cable system to locate the fault or defect in the cable by detecting the radio-frequency signals radiating from the cable. In another procedure used to locate a fault in a cable, increasingly smaller sections of the cable system are switched out of the system until the interference is no longer detected, whereby the location of the fault can be isolated to a relatively short length of the cable, after which the section of cable is further examined to locate the actual fault on the cable. Both of these and other known procedures used to locate faults in cable systems are, however, time-consuming and costly, and may, in one of these procedures, require the interruption of transmission to those subscribers whose receivers are connected to the sections of the cable system that are temporarily disconnected while the search for the fault is underway. The known fault-locating procedures also require the cable system operator to make significant investment in equipment and in the salaries of trained employees who perform the procedures. Another serious disadvantage to these and other known cable fault-locating procedures is that the procedures can only be performed after there has been an indication that radio-frequency signals are gaining ingress into the cable, and they are generally ineffective in locating the source or cause of intermittent ingress into the cable system.

It is an object of the present invention to provide means for accurately and quickly locating the source and cause of radio-frequency signal ingress into a cable television system.

It is a further object of the present invention to provide a subscriber terminal capable of quickly and accurately measuring and detecting the level of radio-frequency ingress at the terminal.

It is another object of the present invention to provide in a cable return system means to vary the return frequency of a subscriber terminal at which ingress has been detected so as to avoid interference with the ingress.

To these ends, the present invention is directed to a terminal for use at a cable television subscriber location from which information within a return frequency spectrum can be transmitted by the subscriber terminal along the cable back to a central station or headend. The subscriber terminal of the invention includes a radio-frequency receiver which sequentially monitors and detects the level of ingress at the terminal at various preselected frequencies within the return frequency spectrum that may result, for example, from a fault in the cable. In one aspect of the invention, the frequencies at which ingress is monitored is established in the terminal in response to a coded signal received from the headend and stored in the terminal.

Signals representing the magnitude of detected ingress at each of the monitored frequencies modulate a return ingress-detect signal which is transmitted from the subscriber terminal along the cable to the headend. The ingress-detect signals received at the headend from the subscriber terminals in the system permit the source of the ingress to be accurately and quickly located and then repaired. In another aspect of the invention, in the event the detected ingress at any of the monitored frequencies exceeds a preset level, the headend thereafter is caused to transmit a new coded signal to instruct the subscriber terminal to modify the frequency of the return signal in subsequent transmissions, thereby to avoid interference with the detected signal in the transmission of the return signal.

To the accomplishment of the above and to such other objects as may hereinafter appear the present invention relates to an ingress-monitoring subscriber terminal for use in a cable television system, substantially as defined in the appended claims and as described in the following specification as considered together with the accompanying drawings in which:

Figure 1:
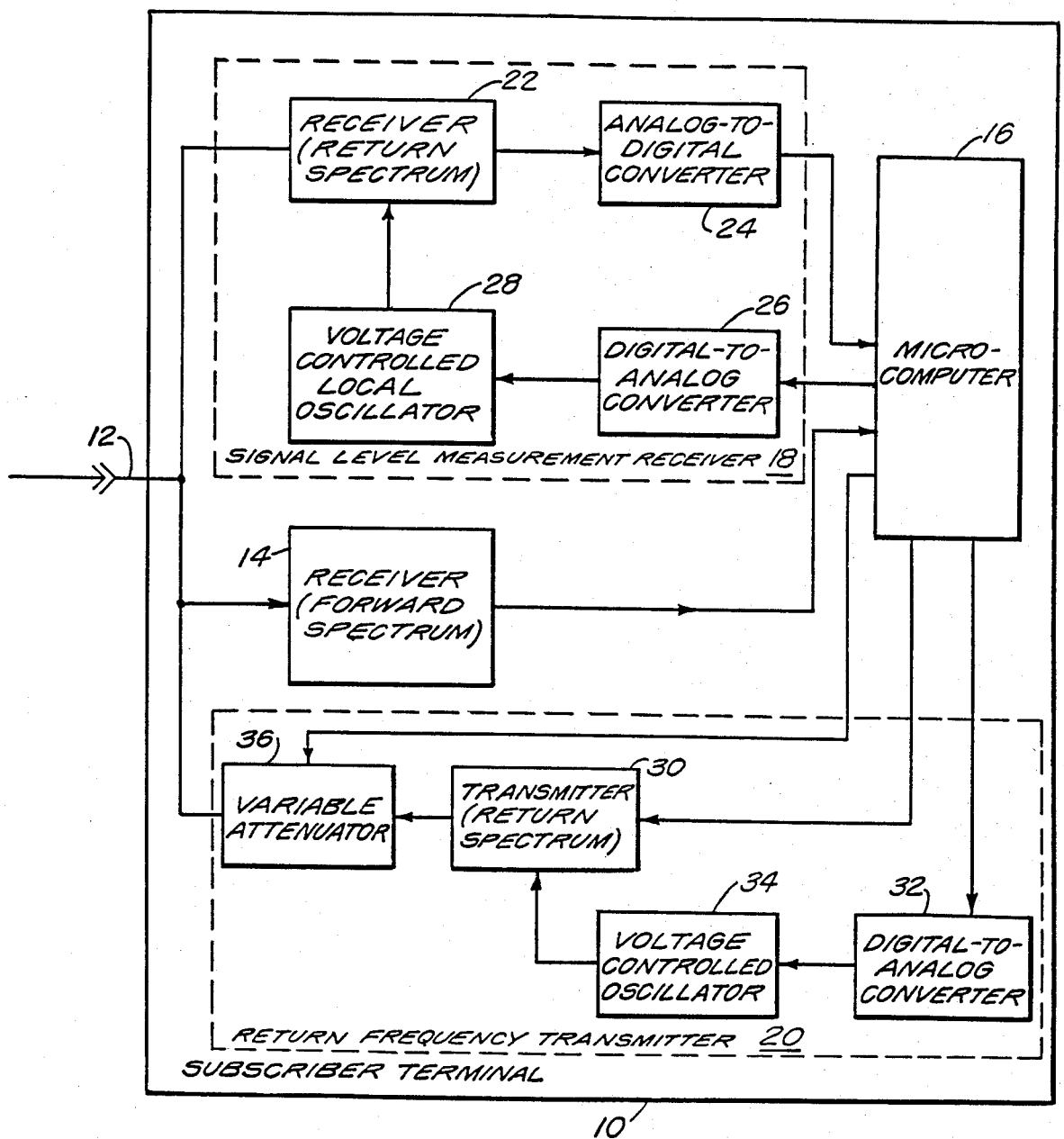
FIG. 1 is a schematic block diagram of an ingress-monitoring subscriber terminal according to the present invention.

Referring to FIG. 1, a subscriber terminal in accordance with the invention, generally designated 10, is connected through a cable 12 to a cable television system headend or central station (not shown in the drawing). The subscriber terminal 10 includes a control signal receiver 14, which receives a coded frequency shift-keyed command signal from the headend via the cable 12. The control receiver 14 detects the frequency shift-keyed signal and applies a corresponding signal containing, in digital form, information obtained from the headend specifying the address of the subscriber terminal, the frequency or frequencies at which ingress is to be monitored, and the system return transmit signal frequency to a microcomputer or microprocessor 16. The ingress-monitoring frequencies, as specified to the terminal from the headend, may be established as a result of actual ingress detected at the headend or as a function of the time of year during which different types of ingress are anticipated. The subscriber terminal 10 also includes a signal level measurement receiver, generally designated 18, which detects ingress on the cable 12 and applies an ingress signal to the microprocessor 16, and a return frequency transmitter 20 connected to the microprocessor 16 and to the cable 12 to transmit information concerning the detected ingress to the headend via the cable.

The signal level measurement receiver 18 includes a return spectrum receiver 22 having an input coupled to the cable 12, an analog-to-digital converter coupled to the output of receiver 22 and to an input of microcomputer 16, a digital-to-analog converter 26 connected to an output of the microprocessor 16, and a voltage-controlled oscillator 28 connected to the output of converter 26 and to the mixer stage of receiver 22. The output frequency of oscillator 28 is established by a control voltage received from the output of digital-to-analog converter 26, the input of which receives a digital frequency control signal from microprocessor 16.

Figure 2:
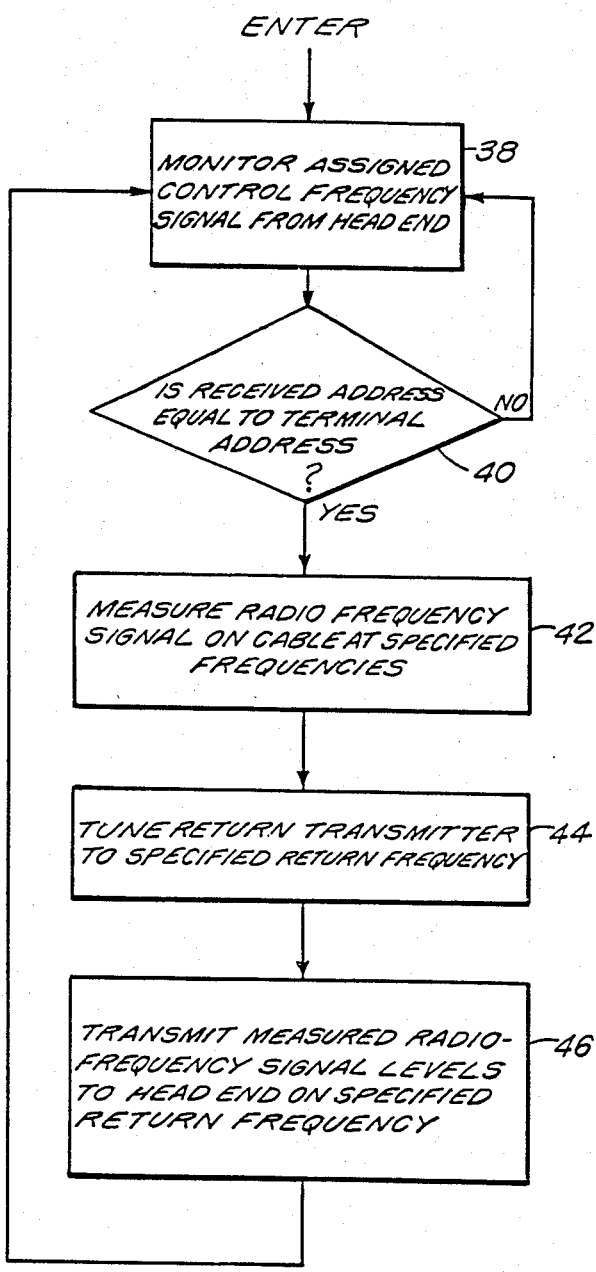
FIG. 2 is a flow chart of a portion of the program implemented in the microprocessor of the subscriber terminal of FIG. 1.

Microprocessor 16 contains a program, a portion of which is illustrated in FIG. 2, which may be stored in the microprocessor in, for example, a programmable read-only memory (PROM). The digital frequency control signal applied to converter 26 from the microprocessor 16, as a function of the coded signal received from the headend and stored therein, specifies a predetermined number, e.g. four, of selected frequencies in the radio-frequency range of the system return spectrum, such as between 5 and 30 mHz, which are to be monitored for ingress in the return spectrum receiver 22. The monitored ingress frequencies are preferably selected to fall within one of the available return frequencies at which information from the subscriber's security terminal or the like is transmitted back to the headend along the cable 12. As an alternative to the frequencies at which ingress is to be monitored being preloaded from the headend, the microprocessor 16 may be preprogrammed to generate a frequency-scan signal to establish output frequencies for oscillator 28 to cause the return spectrum receiver 22 to monitor ingress at a number of predetermined frequencies of, for example, 5, 10, 20 and 30 mHz.

To this end, the digital frequency-scan signal from the microprocessor 16 is applied to the input of digital-to-analog converter 26, which converts that signal to a corresponding series of analog voltages at different levels that are applied sequentially to the control terminal of variable-frequency oscillator 28. The number of voltage levels developed at the output of converter 26 is the same as the number of monitored ingress frequencies, here four. Oscillator 28, in accordance with these four scan voltages, sequentially provides a series of local oscillator signals at four different frequencies to the mixer stage of receiver 22 in which these signals are mixed or heterodyned with radio-frequency signals that may have gained ingress onto the cable.

The signal produced by oscillator 28 thus heterodynes with any ingress signals that may be on the cable at the several preselected monitored ingress frequencies so as to develop a series of ingress-detect signals at a predetermined intermediate frequency. For each monitored frequency at which an ingress signal is detected on the cable, the resulting intermediate-frequency signal developed in receiver 22 will be of a magnitude that corresponds to the magnitude of the detected ingress signal.

These intermediate-frequency signals are detected in receiver 22 to produce a series of analog signals each having an amplitude that is proportional to the magnitude of any radio-frequency ingress that is detected at the four monitored frequencies. These analog output signals from receiver 22 are applied sequentially to the input of analog-to-digital converter 24, which converts the signals to a corresponding series of digital signals that are applied to the microprocessor 16 in which the signals are processed to produce information relative to the magnitudes of each of the detected ingress signals at the monitored ingress frequencies.

The return frequency transmitter 20 includes a return spectrum transmitter 30 having an input coupled to an output of microprocessor 16; a digital-to-analog converter 22, which includes an input coupled to an output of microprocessor 16; a voltage-controlled oscillator 34 having an input coupled to the output of converter 32, and an output applied to the mixer stage of transmitter 30; and a variable attenuator 36 connected intermediate the output of the return spectrum transmitter 30 and the cable 12.

In operation, the ingress-detect signals detected in receiver 22 and applied in digital form to the microprocessor 16 are processed there in accordance with the latter's prestored program. That operation produces a digital transmit-control signal, which is applied to an input of return spectrum transmitter 30. The transmit-control signal thus represents the magnitude and frequency of any detected ingress, as well as the address of the subscriber terminal. The microprocessor 16 also applies a frequency-control digital signal to the input of digital-to-analog converter 32 based on the transmit frequency command signal received at receiver 14 from the headend. The frequency-control signal is converted in converter 32 to a corresponding analog voltage that is, in turn, applied to the control terminal of voltage-controlled oscillator 34 to control the latter's frequency of oscillation.

The radio-frequency output of oscillator 34 is applied to the mixer stage of return spectrum transmitter 30, where the signal is modulated by the transmit-control digital signal applied to the return spectrum transmitter 30 from the microprocessor 16. The output of return spectrum transmitter 30 is thus a frequency shift-keyed radio-frequency signal having a center transmit frequency established by the coded frequency command signal received from the central station, and which is modulated by the digital ingress-detect signal developed by the microprocessor 16. That signal, as noted, contains information relative to the magnitude and frequency of the ingress signals detected at receiver 22, as well as the address of the particular subscriber terminal.

The output of return spectrum transmitter 30 is applied to the input of variable attenuator 36, which also receives a control signal from the microprocessor 16 that represents the magnitude of the detected ingress signal at the transmit frequency. In the event of ingress at the transmit frequency exceeding a predetermined level, as determined in the microprocessor 16, the amount of attenuation provided by attenuator 36 to the transmit signal is decreased to permit a greater level of the transmit signal to be transmitted on the cable to the headend at that frequency. Conversely, for a low level of detected ingress at the transmit frequencies, the attenuation provided in attenuator 36 to the return transmit signal is relatively high so that the return signal on the cable does not exceed certain maximum transmission levels. The attenuator 36 may also be operated in response to a transmission-terminate signal from the microprocessor 16 to effectively turn off the return transmitter during those periods in which the subscriber terminal is not addressed from the headend.

To perform and control the various operations described above, the microprocessor 16 is programmed according to known techniques to carry out the following functions:

(a) Receive the forward signal digital information from the forward system control signal receiver 14, including the start command, address, frequencies in the return frequency spectrum to be monitored for ingress, and transmit frequency information;

(b) Command the return spectrum receiver 22 to monitor one or more frequencies including the transmit frequency;

(c) Accept the magnitude of the ingress at each monitored frequency from receiver 22;

(d) Control the frequency of the return spectrum transmitter 30;

(e) Provide digital signals indicating the detected ingress magnitude to modulate the return spectrum transmitter 30; and (f) Provide a signal to the variable attenuator 36 based on the measured magnitude of the detected ingress signal.

A portion of the program implemented in the microprocessor 16 is illustrated in the program flow chart of FIG. 2. As therein shown, the program is entered in step 38 wherein the assigned control frequency and subscriber address, as established by the frequency shift-keyed signal received at forward spectrum receiver 14, are monitored. The received address is entered in step 40 where a determination is made if the received address signal is that of the particular subscriber terminal. If the received address does not match the address of the subscriber terminal, the program returns to step 38; if the address matches that of the subscriber, the program proceeds to step 42 in which the return spectrum receiver 22 is instructed to measure the radio-frequency signal on the cable at the specified ingress frequencies as determined by the signal from the headend which establishes the frequency to be monitored for ingress in the return spectrum.

In step 44, the return spectrum transmitter 30 is instructed by means of a signal applied to digital-to-analog converter 32 to operate at a return frequency as also specified in the coded signal received at receiver 14. Finally, in step 46 of the program, the return transmitter signal at the specified return frequency is modulated by a signal representative of the monitored radio-frequency ingress signals. The program is then returned to step 38.

In the operation of a cable system in which each of the subscribers is provided with a terminal of the type described hereinabove, each of the terminals on the system receives a start command signal from the central headend station, each terminal being separately and sequentially addressed. The central station, upon receiving signals from one or more of the terminals indicating the detection of an excessive level of ingress at one or more of the monitored frequencies in the manner described above, will select a transmit frequency that is different from any of the frequencies at which a greater than specified magnitude of ingress has been detected for use in subsequent return transmissions so as to avoid interference in subsequent return transmissions as a result of the ingress. The detection and measurement of the monitored ingress signals at the various subscriber terminals in the manner described above can also be used to accurately and quickly locate the fault in the cable at which the ambient radio-frequency signal in the return spectrum is gaining ingress into the cable, as in the examples given with reference to FIGS. 4 and 5, which illustrate a cable system in which a fault has occurred along one cable span of a cable system and in which the resulting ingress is detected and measured in a plurality of subscriber terminals connected to that cable span by means of the subscriber terminal of the invention as illustrated in FIG. 1.

Figure 4:
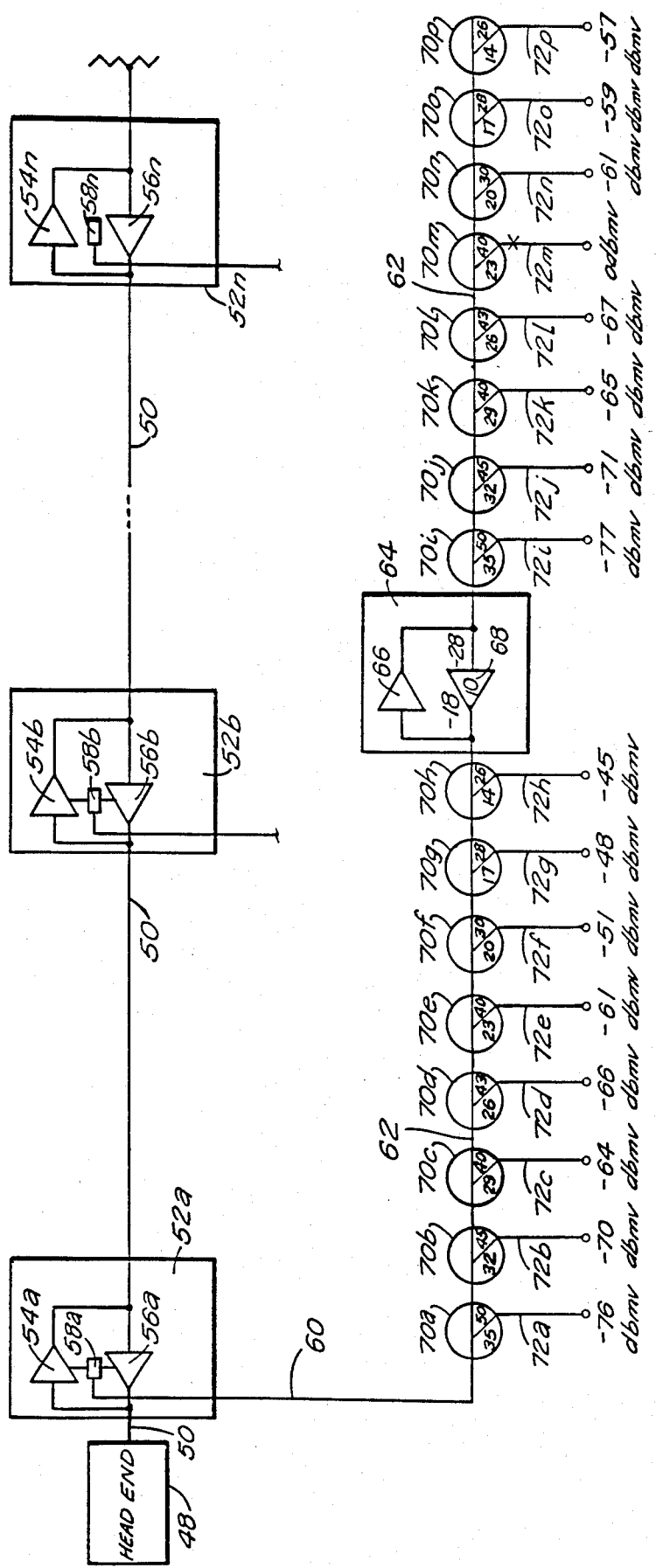
FIG. 4 is a schematic design of a cable system in which a fault is located in subscriber drop line.
Figure 5:
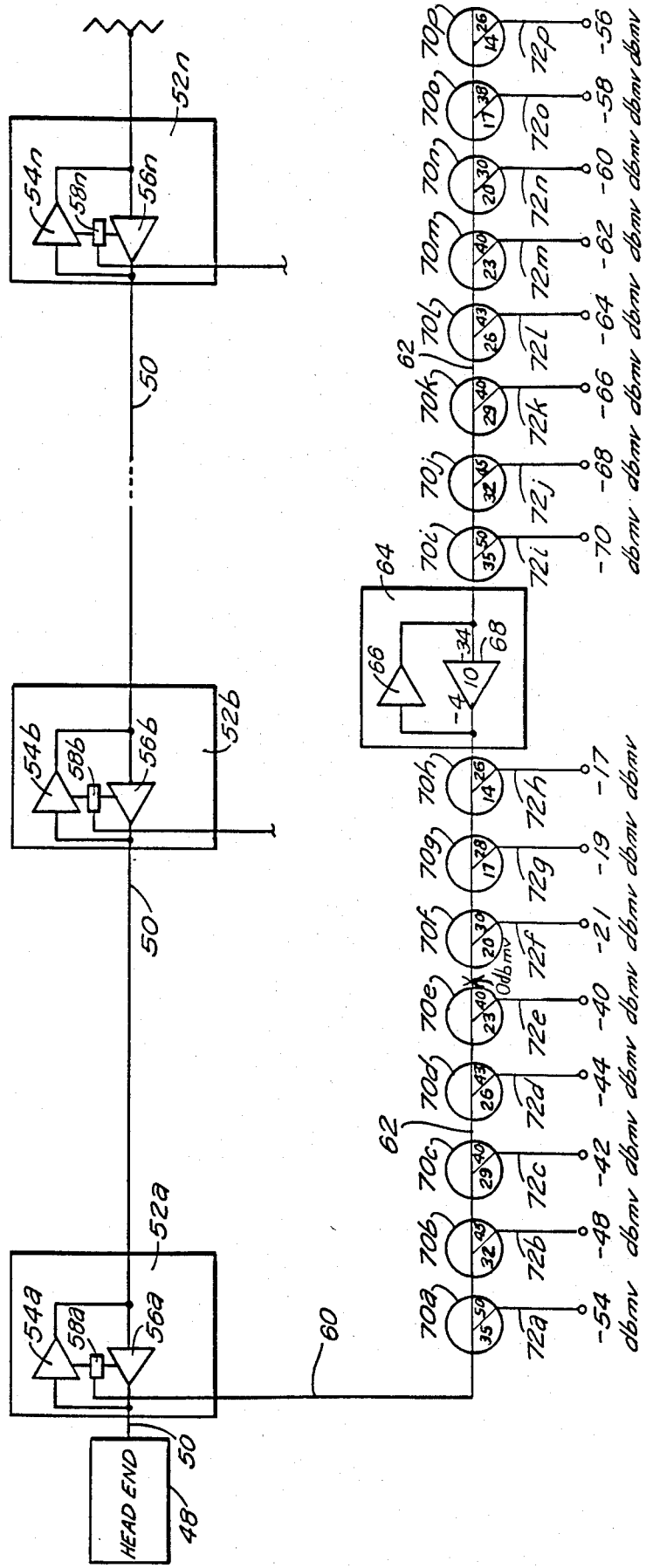
FIG. 5 is a schematic diagram similar to that of FIG. 4 of a cable system in which a fault is located in a feeder line cable span.

As shown in FIGS. 4 and 5, the cable system includes a headend 48 connected by a length of coaxial cable 50 to one of a series of trunk stations 52, $a, b \ldots n$, spaced along the trunk cable 50. Each of the trunk stations 52 includes a pair of oppositely connected forward and return amplifiers 54 and 56 with a filter 58 connected therebetween. In a typical cable system, the forward amplifier 54 passes signals in the forward spectrum of 50–400 mHz, whereas the return amplifier 56 passes the return signals in the return frequency spectrum of 5–30 mHz.

Each of the filters 58 is connected by means of a feeder line 60 to a cable span 62 in which a line extender 64 comprising a forward amplifier 66 and a return amplifier 68 is interposed at suitable locations. Cable span 62 is respectively connected by means of directional couplers 70$a$–$p$ to a series of drop lines 72-$p$, the latter being respectively connected to a corresponding number of subscriber terminals (not shown in FIGS. 4 and 5).

Figure 3:
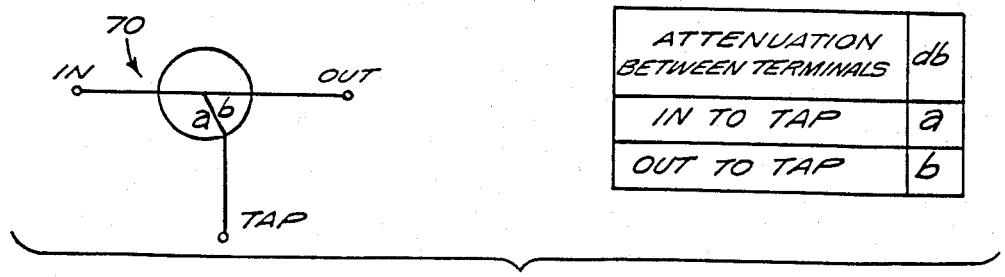
FIG. 3 is a schematic diagram of a directional coupler employed in a typical cable system for use in explaining the use of the subscriber terminal of the invention in the cable systems illustrated in FIGS. 4 and 5.

Each of directional couplers 70 is illustrated in FIGS. 4 and 5 in accordance with the representation of a coupler provided in FIG. 3 which, as shown in the accompanying chart, has an attenuation expressed in db between the "in" terminal and tap by the numerical indication in FIGS. 4 and 5 corresponding to the letter a in FIG. 3, and an attenuation expressed in db between the "out" terminal and the tap by the numerical indication corresponding to the letter b. In addition, it is assumed in the system illustrated in FIGS. 4 and 5 that each of the lengths of cable spans between adjacent couplers 70 has an attenuation of 3 db in the forward direction and an attenuation of 1 db in the reverse or return direction. It is also assumed that the level of ingress at a location on the cable at which a fault occurs is 0 dbmv.

In the example illustrated in FIG. 4, in which a fault X occurs in the drop line 72$m$, the ingress at the subscriber terminal connected to that drop line will thus be at a level of 0dbmv and the levels of ingress measured at the subscriber terminals connected to that cable span that result from the fault will be at the values shown in FIG. 4 at the drop lines 72$a$–$l$ and 72$n$–$p$. Similarly in the situation illustrated in FIG. 5, in which the location of the fault X is in the cable span adjacent directional coupler 70$e$, the levels of ingress measured at the various subscriber terminals connected along cable span 62 will be at the values indicated in FIG. 5 at each of the drop lines 72$a$–$p$, as a result of the attenuation to the ingress offered by the directional couplers and lengths of cable span between the location of the fault and the subscriber terminals at which the levels of the ingress are measured.

The subscriber terminals sequentially transmit signals at the specified return frequency to the headend indicating the level of ingress detected at each terminal in the manner described above. With such ingress information available at the headend from the various subscriber terminals on the cable system, a data-processing system at the headend can provide the system operator with an ingress magnitude map of the entire cable system. This information could then be used by the cable system maintenance personnel to isolate the location of the cable fault at which the ingress is occurring to enable them more expeditiously to determine the exact location along the system at which the cable shielding is faulty.

In the event that, as in FIG. 4, only one subscriber terminal in the system indicates an unacceptable level of radio-frequency ingress, then only the hardware associated with that individual subscriber need be checked to locate the fault. If, on the other hand, as in FIG. 5, several subscriber terminals, connected to a particular cable feeder line on which the fault is located detect and report unacceptable levels of ingress in the manner described, then that feeder line segment would be checked to locate the fault.

It will thus be appreciated that the subscriber terminal of the present invention is capable of quickly and accurately locating sources of radio-frequency ingress into a cable television system, thereby to expedite the correction of the ingress problem and to cause subsequent return transmissions to be unaffected by the ingress so long as the ingress remains uncorrected. It will also be appreciated that although the present invention has been described hereinabove with respect to one embodiment, modifications may be made therein, such as in the number and frequencies of the monitored ingress signals, without necessarily departing from the spirit and scope of the invention.

What is claimed is:

1. A subscriber terminal for connection to a headend by means of a cable, said terminal comprising means including first receiver means for monitoring and detecting the presence of at least one radio-frequency ingress signal on said cable, second receiver means connected to said cable for receiving coded signals from the headend, said coded signals including an ingress-frequency select signal and a return frequency command signal, means connected to the cable for transmitting a return signal to the headend at a specified return frequency, and control means operatively connected to said transmitting means and to said first and second receiver means and effective in response to said ingress-frequency select signal and return frequency command signal received from the headend, to select the frequency of said at least one ingress signal which said first receiver means is to monitor and detect, to code said return signal to represent information concerning the detected ingress signal and to control the transmitting means to transmit said return signal at said specified return frequency.

2. The subscriber terminal of claim 1, in which said first receiver means comprises means for sequentially detecting a plurality of radio-frequency ingress signals at a corresponding plurality of different frequencies.

3. The subscriber terminal of claim 2, in which said first receiver means further comprises a variable-frequency source for providing a local oscillator signal, and means operatively connected to said variable-frequency source for sequentially varying the frequency of said local oscillator signal.

4. The subscriber terminal of claim 3, in which said variable-frequency source includes a voltage-controlled oscillator, said frequency-varying means comprising means for applying a sequentially varying analog signal to said voltage-controlled oscillator.

5. The subscriber terminal of claim 4, in which said second receiver means includes means for receiving and detecting a command signal in said coded signals, said command signal containing a terminal address signal and said return frequency command signal.

6. The subscriber terminal of claim 5, said control means comprising a microprocessor operatively connected to said first and second receiver means, means for applying said detected return frequency command signal to said microprocessor, and means operatively connected to said microprocessor and to said transmitting means for determining the output frequency of the latter in accordance with said frequency command signal.

7. The subscriber terminal of claim 6, in which said means for determining includes a second voltage-controlled oscillator operatively connected for supplying energy to said transmitting means, and means for applying a voltage to said second voltage-controlled oscillator corresponding to said frequency command signal.

8. The subscriber terminal of claim 7, further comprising a variable attenuator operatively coupled to the output of said transmitting means, and means including said microprocessor responsive to the magnitude of the detected ingress signal for modifying the attenuation provided to the return signal by said variable attenuator.

* * * * *